Jan. 28, 1936.  N. F. HADLEY ET AL  2,029,165
VEHICLE CONTROL
Original Filed Jan. 2, 1931  2 Sheets-Sheet 1

INVENTORS
NEWTON F. HADLEY AND
EDWARD J. DELAHANTY.
BY
ATTORNEYS.

Jan. 28, 1936.  N. F. HADLEY ET AL  2,029,165
VEHICLE CONTROL
Original Filed Jan. 2, 1931   2 Sheets-Sheet 2
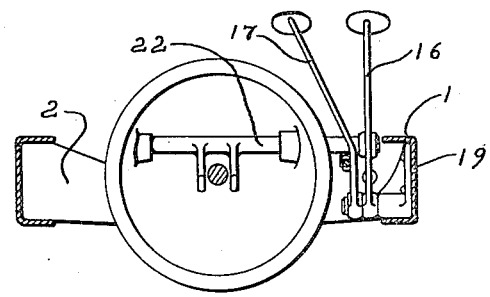
Fig. 3
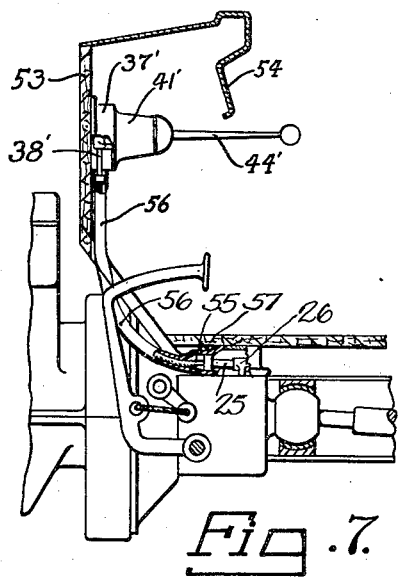
Fig. 7
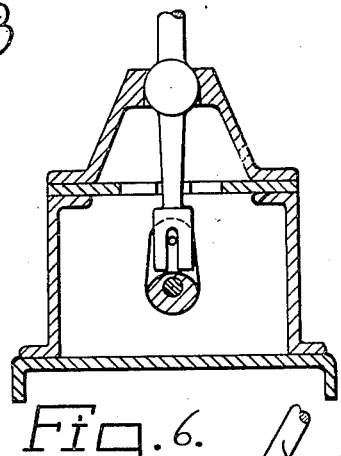
Fig. 6
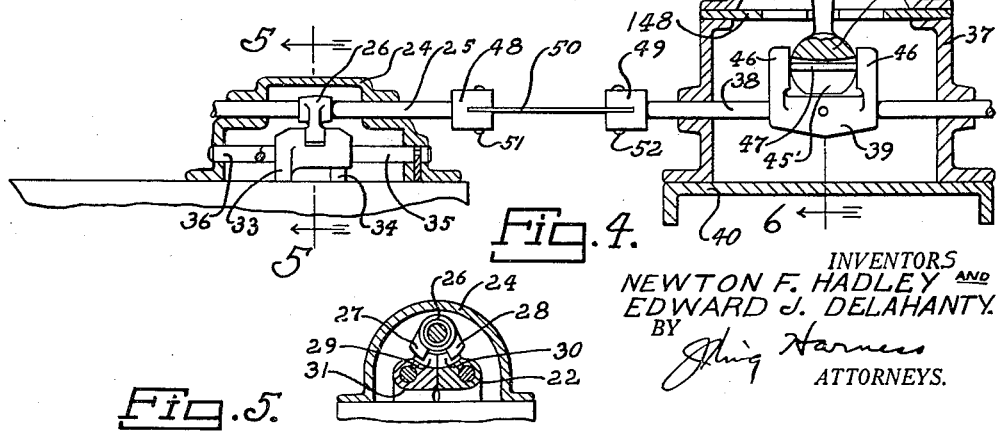
Fig. 4
Fig. 5
INVENTORS
NEWTON F. HADLEY AND
EDWARD J. DELAHANTY.
BY
ATTORNEYS.

Patented Jan. 28, 1936

2,029,165

UNITED STATES PATENT OFFICE 2,029,165

VEHICLE CONTROL

Newton F. Hadley, Beverly Hills, and Edward J. Delahanty, Detroit, Mich., assignors to Chrysler Corporation, Detroit, Mich., a corporation of Delaware Application January 2, 1931, Serial No. 506,114
Renewed July 19, 1935

3 Claims. (Cl. 180—64)

This invention relates to improved control apparatus, and particularly to clutch operating and gear shifting mechanism for motor vehicles which have resiliently mounted motors.

Vehicles of the recent construction have resiliently mounted motors which, during operation, move within predetermined limits relative to the chassis frame of the vehicle. In some motor vehicles, the rear end of the motor is supported by a swivel type bearing which is carried by the chassis frame structure, the front end of the motor being seated on a leaf spring that is secured directly to the front axle. This type of mounting permits free pivotal movement of the main portions of the motor and its clutch and transmission within comparatively wide limits. The freedom of movement of the motor and the associated clutch and transmission causes excessive vibration of the clutch pedal and gear shift lever, particularly when the latter are mounted on the motor as in conventional vehicle construction.

The main objects of the invention are to provide an improved clutch control which is pivotally mounted on the chassis frame and flexibly connected to the clutch mechanism so as to obviate movement of the clutch control relative to the vehicle frame and body as the motor turns upon its pivot; to provide a gear shift lever mounting which is supported directly on the frame structure; to provide a mounting of this kind which is also adapted to be located on the dash of a vehicle, if desired; and to provide a flexible link connection between the gear shift lever and the clutch mechanism which prevents the gear shift lever from being vibrated as the motor moves relative to the chassis frame and body.

Further objects of the invention are to provide gear shifting apparatus for the transmission of a resiliently mounted motor of this kind which is adapted to be operated by a gear shift lever that is located either on the dash or on the frame structure of a vehicle; and to provide an improved flexible mounting for the muffler of a resiliently mounted vehicle engine which permits the muffler and the pipes communicating therewith to move freely in unison with the motor.

An illustrative embodiment of the invention is shown in the accompanying drawings, in which:

Fig. 3 is a transverse vertical section taken on the line 3—3 of Fig. 1.

Fig. 4 is a vertical section of the gear shifting apparatus taken longitudinally of the vehicle chassis.

Fig. 5 is a transverse vertical section taken on the line 5—5 of Fig. 4.

Fig. 6 is a transverse vertical section taken on the line 6—6 of Fig. 4.

Fig. 7 is a fragmentary section of a vehicle showing our improved operating element for the gear shifting mechanism located on the dash of the vehicle.

Figure 1:
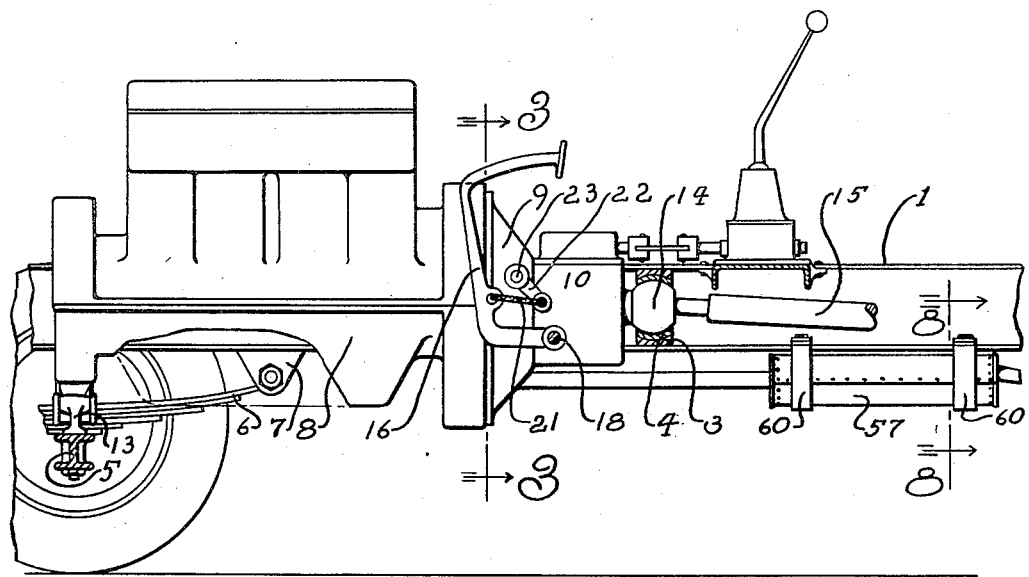
Fig. 1 is a side elevation, partly in section, of a vehicle chassis showing our improved clutch control, transmission control and muffler mounting.
Figure 2:
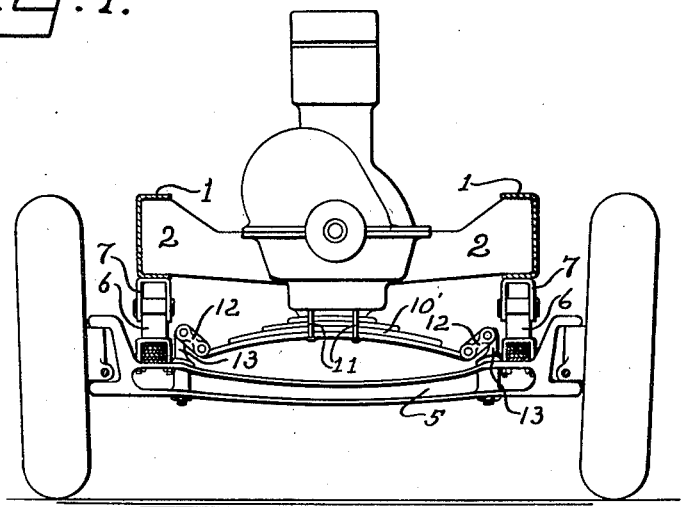
Fig. 2 is a front elevation, partly in section, of the vehicle chassis shown in Fig. 1.
Figure 8:
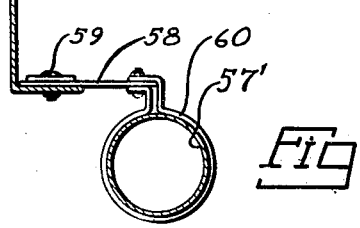
Fig. 8 is a transverse section of a muffler and its mounting taken on the line 8—8 of Fig. 1.

In the form shown, our invention is illustrated in conjunction with a vehicle having a chassis frame 1 which is provided intermediate its ends with a transverse member 2 in which a swivel type socket 3 having a bearing lining 4 is formed. The front end of the frame 1 is supported in a conventional manner, upon the front axle 5 of the vehicle by longitudinally extending, semi-elliptical springs 6 which are rigidly attached to the axle and pivotally attached to the frame by brackets 7. The power unit or motor 8 of the vehicle is of conventional construction and includes clutch and transmission mechanism 9 and 10, respectively.

In the illustration shown, the front end of the power unit is yieldably mounted directly upon the front axle 5 by a resilient spring 10' of the semi-cylindrical type which is secured at its intermediate part to the block of the engine by bolts 11 and pivotally attached by shackles 12 to posts 13 which are fixed on the front axle. Formed on the other end of the power unit, at the rear of the transmission, is a fragmentary ball or sphere 14 which is swiveled in the socket 3 of the transverse member 2. The ball 14 is hollow and it accommodates a universal joint (not shown) by which the main driving shaft 15 of the vehicle is connected with the power unit.

This combined pivotal and resilient mounting of the motor permits the latter to rock in any direction about the ball and socket joint. However, the spring 10' limits the movement of the front end of the motor in certain directions, but it allows substantial turning about the longitudinal axis of the motor and considerable vertical movement thereof.

In vehicles having power units mounted in the above manner, the comparatively large freedom of movement of the motor, including the clutch and transmission mechanism, causes the clutch and transmission controls, which is conventional construction are carried by the motor, to vibrate excessively. With our improved construction, the clutch and brake pedals 16 and 17 are journaled on a shaft 18 which is rigidly attached to the left channel shaped side member 19 of the frame 1. The clutch pedal 16 of the clutch mechanism is flexibly connected by a flexible cable 21, preferably comprising wire, to an arm 22 of a clutch disc operating shaft 23 which extends transversely through the clutch housing. The cable 21 permits the power unit to vibrate and move relative to the chassis frame without transmitting vibrations to the clutch pedal 16 and this cable has sufficient slack, when the pedal 16 is in a released position, to allow substantial movement of the motor relative to the chassis frame without wholly or partially disengaging the clutch mechanism. The brake pedal 17 is connected with braking apparatus (not shown) that is mounted on the chassis frame and for this reason it is not vibrated by movement of the motor.

The transmission mechanism 10 is mainly identical in structure to that used in conventional vehicle construction, but in place of providing a gear shift lever on the cover 24 of the transmission case, a gear shift lever is located in rearwardly spaced relation to the transmission. Slidably and rotatably mounted in the transmission case cover 24 is a shaft 25 which extends longitudinally of the vehicle and protrudes beyond the respectively opposite ends of the cover. This shaft is provided with a collar 26 on which spaced lugs 27 and 28 are formed. The lugs 27 and 28 register with arcuate grooves 29 and 30 formed in collars 31 and 32 of gear shift forks 33 and 34 which are mounted on gear shift shafts 35 and 36, respectively.

A housing 37 having a slidable and rotatable shaft 38 is mounted on a transverse channel-shaped member 40 which is secured at its ends to the respectively opposite longitudinal side members of the chassis frame 1. The shaft 38 extends longitudinally of the vehicle substantially in alignment with the shaft 25 of the transmission mechanism and it has a rigidly attached yoke 39. The housing 37 has a frustro-conical shaped cover 41 in the upper end of which is formed a socket 42 for receiving a ball 43 on a gear shift lever 44. Formed on the lower extremity of the gear shift lever 44 is a ball 45 which is received between the prongs 46 of the yoke 39. The ball 45 has a slot 45' in which is received a pin 47 that extends between the prongs of the yoke. A guide, commonly known as an H plate 148 is interposed between the inner housing 37 and cover 41 thereof for limiting the movement of the gear shift lever.

Formed on the adjacent ends of the shafts 25 and 38 are coupling elements 48 and 49, respectively which receive the opposite end portions of a flexible connecting member 50, preferably comprising a steel strap. The strap 50 is pivotally attached at its opposite ends to the coupling elements 48 and 49 by rivets 51 and 52, respectively.

When the gear shift lever 44 is tilted to the right and to the left, it rotates the shaft 25, flexible connecting element 50 and shaft 38 in corresponding directions so as to selectively engage the prongs 27 and 28 of the collar 26 with their respective gear shift forks. As the gear shift lever 44 is tilted forwardly or rearwardly, the shaft 38, and connecting element 50 move the shaft 25 forwardly and rearwardly so as to form the desired gear ratio in the transmission mechanism.

The flexible connecting member 50 is located substantially in vertical registration with the ball and socket which support the rear end of the power unit and therefore as the latter moves relative to the chassis frame, the connecting element 50 is subjected to only a minimum flexure. The inherent flexibility of the strap 50 and its pivotal attachments to the shafts 25 and 38 permit substantial relative movement between the power unit and the chassis frame, and structure upon which the gear shift lever is mounted without vibrating the gear shift lever.

In the form shown in Fig. 7, a housing 37' having a cover 41' and which encloses mechanism substantially identical to that shown at the right in Fig. 4, is mounted on the dash 53 of the vehicle. Swiveled in the cover 41' is a gear shift lever 44' which extends outwardly beyond the instrument board 54 of the vehicle. The shaft 38' in the housing 37' is connected with the forward end of the shaft 25 by a flexible cable 55 which is enclosed within a tube 56 that is secured to a bracket 57 on the cover 24 of the transmission. The transmission mechanism may be operated in the above manner by the manipulation of the gear shift lever 44'.

In order to permit free movement of the muffler 57' in unison with the power unit and with respect to the chassis frame, the muffler is flexibly mounted on a side member of the chassis frame by a flexible strip 58, preferably comprising brake lining, or other suitable material, which is attached by a bolt 59 to the side member of the frame 1 at one end, and clamped at its other end between adjacent end portions of a metal band 60 which extends around the muffler 57'.

Although but one specific embodiment of this invention has herein been shown and described, it will be understood that various changes in the size, shape and arrangement of parts may be made without departing from the spirit of our invention and it is not our intention to limit its scope other than by the terms of the appended claims.

What we claim is:

1. In a vehicle having a chassis frame and a motor including variable transmission mechanism, a member on one end of said motor swiveled on said frame, means yieldably supporting the other end of said motor, a housing having a gear shift lever swiveled therein mounted on said frame rearwardly of said member, a shiftable shaft operatively associated with said gear shift lever and rotatably mounted in said housing, and a flexible link located in registration with said member pivotally attached at one end to said shaft and at the other end to said transmission mechanism for operating the latter by movement of said gear shift lever and adapted to prevent movement of said gear shift lever by the movement of said motor.

2. The combination of a frame, a power plant unit including a variable transmission, said power plant unit being of the type that is subject to oscillation about a predetermined axis under the influence of the forces inherent in its operation, means for mounting said power plant unit on said frame constructed and arranged in such a manner as to permit oscillatory movement of said power plant about said axis, means for changing the gear ratio of said transmission including a member rotatably mounted on said unit and shiftable linearly relative thereto in the direction said axis extends, operating apparatus mounted on said frame independently of said unit, and a flat flexible means for providing an operative connection between said rotatably mounted shiftable member and said operating apparatus, said flat flexible means being arranged in a horizontal plane to permit substantially free oscillation of said unit about said axis.

3. The combination of a frame, a power plant unit including a variable transmission, said power plant unit being of the type that is subject to oscillation about a predetermined axis under the influence of the forces inherent in its operation, means for mounting said power plant unit on said frame constructed and arranged in such a manner as to permit oscillatory movement of said power plant about said axis, means for changing the gear ratio of said transmission including a member rotatably mounted on said unit and shiftable linearly relative thereto in the direction said axis extends, operating apparatus mounted on said frame independently of said unit and having a shiftable rotatably mounted member in close proximity to said first mentioned shiftable rotatably mounted member, and a blade-like connecting element comprising flexible material pivotally connected at its opposite ends to the shiftable rotatably mounted member of said gear ratio changing means and said operating apparatus respectively, said blade-like connecting element being constructed and arranged in such a manner as to permit substantially free oscillation of said unit about said axis.

NEWTON F. HADLEY.
EDWARD J. DELAHANTY.